(12) United States Patent
Kuklinski

(10) Patent No.: US 6,684,801 B1
(45) Date of Patent: Feb. 3, 2004

(54) SUPERCAVITATION VENTILATION CONTROL SYSTEM

(75) Inventor: Robert Kuklinski, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/267,096

(22) Filed: Oct. 3, 2002

(51) Int. Cl.$^7$ ................................................. B63B 1/34
(52) U.S. Cl. ................................................. 114/67 A
(58) Field of Search ............................ 114/67 R, 67 A, 114/20.1; 244/204, 207–212, 130; 102/399

(56) References Cited

U.S. PATENT DOCUMENTS

| | | | | |
|---|---|---|---|---|
| 3,016,865 A | * | 1/1962 | Eichenberger | 114/67 A |
| 3,041,992 A | * | 7/1962 | Lee | 114/312 |
| 3,075,489 A | * | 1/1963 | Eichenberger | 114/67 A |
| 3,205,846 A | * | 9/1965 | Lang | 114/67 A |
| 3,286,674 A | * | 11/1966 | Thompson et al. | 114/67 A |
| 3,382,831 A | * | 5/1968 | Madison | 114/20.2 |
| 3,392,693 A | * | 7/1968 | Hulsebos et al. | 114/20.1 |
| 3,435,796 A | * | 4/1969 | Merrill | 114/67 R |
| 3,504,649 A | * | 4/1970 | Scherer | 114/278 |
| 3,875,885 A | * | 4/1975 | Balquet et al. | 114/67 A |
| 4,186,679 A | * | 2/1980 | Fabula et al. | 114/20.1 |
| 4,987,844 A | * | 1/1991 | Nadolink | 114/20.1 |
| 5,505,409 A | * | 4/1996 | Wells et al. | 244/130 |
| 5,929,370 A | * | 7/1999 | Brown et al. | 102/399 |
| 5,955,698 A | * | 9/1999 | Harkins et al. | 102/399 |
| 6,167,829 B1 | * | 1/2001 | Lang | 114/278 |
| H1938 H | * | 2/2001 | Harkins et al. | 16/80 |
| 6,405,653 B1 | * | 6/2002 | Miskelly | 102/374 |
| 6,439,148 B1 | * | 8/2002 | Lang | 114/278 |

* cited by examiner

*Primary Examiner*—S. Joseph Morano
*Assistant Examiner*—Ajay Vasudeva
(74) *Attorney, Agent, or Firm*—James M. Kasischke; Michael F. Oglo; Jean-Paul A. Nasser

(57) ABSTRACT

A supercavitation ventilation control system is disclosed and includes a vehicle body having a fore end and an aft end. A cavitator is fit to the fore end of the vehicle body, the cavitator generating a gas cavity around the vehicle body. A cavity control ring is slidably positioned at the aft end of the vehicle body, the cavity control ring selectively adjusting a terminal end of the cavity formed by the cavitator. A stop ring is adjustably positioned on the vehicle body forward of the cavity control ring for managing a reentrant jet generated by the cavity control ring. Each of the stop ring and cavity control ring are moveable by separate actuators and a single control system.

20 Claims, 4 Drawing Sheets

SUPERCAVITATION VENTILATION CONTROL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a supercavitation ventilation control system.

More particularly, the invention relates to a supercavitation ventilation control system in which a terminal end of a cavity boundary is controlled in accordance with vehicle travel at varying speed and depth.

(2) Description of the Prior Art

Supercavitation is a means of drag reduction. Cavitation in a liquid results in gas formation. The presence of gas in the place of liquid that normally contacts an underwater body greatly reduces skin friction and thus permits higher speed travel using the same levels of propulsion thrust. FIG. 1 shows the general features of an underwater vehicle 10 having a forward end 12 and an aft end 14, the underwater vehicle 10 using supercavitation for drag reduction. The direction of travel for the vehicle 10 is shown with arrow 16. A cavitator 18 is positioned at the forward end 12 of the vehicle. The cavitator 18 is the portion of the vehicle body 10 that is in contact with the liquid 20 in which the vehicle is submersed. The motion of the cavitator 18 in the liquid 20 causes a low-pressure wake (not shown) to form aft of the cavitator 18. The pressure in the wake falls as the speed of the vehicle 10 is increased. Eventually the pressure in the wake falls sufficiently such that a vapor pressure is reached and fluid changes state from liquid to gas, forming a cavity 22 surrounding the body 10. The cavitator 18 is normally designed with a blunt forward section 18a and sharp detachment points 18b. The cavity 22 forms at the detachment points 18b. The shape of the cavitator 18 and the speed and depth of the body 10 determines the size and shape of the cavity 22. The body 10 is generally sized to utilize the cavity volume leaving space for a small clearance gap between the body 10 and the liquid 20 outside the cavity 22 designated as the cavity boundary 24. While a fore end of the cavity 22 is nearly filled with the vehicle body 10, an aft portion of the cavity 22 is nearly empty. The empty portion of the cavity 22 exhibits periodic sloshing of liquid called a re-entrant jet or a pair of vortex tubes 26 as shown.

In general, cavities formed by speed of the body alone are too small at any depth to be of practical use in drag reduction. Ventilation of the cavity is normally used to make larger cavities at a given speed or depth. In ventilated cavities, a source of high-pressure gas is introduced into the cavity. The gas causes a rapid expansion of the vaporous cavity, and the cavity continues to grow as ventilation gas enters the cavity, and the pressure in the cavity approaches the ambient depth pressure. A steady state cavity pressure is reached, as the rate of gas leakage from the cavity equals the rate of ventilation gas introduction into the cavity.

FIG. 2 shows the ability to grow a cavity by the introduction of ventilation gas. The cavitation number is the non-dimensional parameter that describes the pressure difference between the gas cavity and the ambient fluid. As the cavitation number decreases, the cavity grows in size. The Froude number is a measure of body speed and the five curves are for five constant Froude numbers increasing from curve 1 to curve 5. The ventilation coefficient is the non-dimensional parameter that describes the volumetric flow of gas into the cavity. The data shows that as ventilation gas increases, the cavitation number lowers and hence the cavity grows. At some point, gas leakage increases dramatically and ventilation flow rate increases cannot be used to expand the size of a cavity. This behavior results from the basic cavity closure in the aft of the cavity and its interaction with the liquid flow.

The body 10 must provide the volume of gas required for ventilation and cavity envelopment of the body. Thus, high gas losses caused by normal cavity closure as outlined above causes increased volumetric requirements of the body 10. This use of the body volume limits travel at certain depths and also limits the use and practicality of supercavitating bodies.

The forces on a supercavitating body are due primarily to contact of the body with wetted flow. Normally this contact is at the cavitator, control fins and the aft section of the body, which planes on the cavity interface. The control of the supercavitating body is not optimal as a result of the fluctuating cavity behavior and the structure of the normal cavity closure.

The following patents, for example, disclose cavitating structures, but do not disclose an apparatus to modify and thereby control the cavity boundary generated by a cavitator as does the present invention.

U.S. Pat. No. 3,016,865 to Eichenberger;
U.S. Pat. No. 3,875,885 to Balquet et al.;
U.S. Pat. No. 3,205,846 to Lang;
U.S. Pat. No. 5,955,698 to Harkins et al.; and
U.S. Pat. No. 6,167,829 to Lang.

Specifically, Eichenberger discloses a method and apparatus for reducing the drag of bodies or vehicles such as a torpedo or a submarine or the like submerged in a liquid such as water. More particularly, the invention relates to a method and apparatus for providing a reduction of such drag by stabilization of a laminar water boundary layer by a gas film introduced between the body and the surrounding liquid whereby the stabilization of the laminar water boundary layer also results in the stabilization of the water-gas interface.

The patent to Lang '846 discloses a torpedo body form and gas layer control. The underwater craft includes an elongated hull having generally rounded transverse sections there along. An annular gas cavity is generated adjacent to the hull and means are provided for communicating the cavity rearward from a predetermined circumferential cavity generation locus of the hull disposed near the nose of the craft to a predetermined circumferential cavity closure and rewet locus of the hull disposed near the tail of the craft. A gas is selectively and varyingly introduced into the cavity for maintaining a predetermined communication between the loci. Means are provided for measuring the thickness of the annular cavity, the means adapted to introduce a variable quantity of gas into to the cavity. In response to the determined thickness, the quantity of gas introduced into the cavity is controlled in an inverse relationship to the cavity thickness.

Balquet et al. discloses an air injection propulsion system for marine vessels including a primary gas injector for creating an axial gas flow beneath the vessel's hull, a primary aerator located beneath the vessel's hull for generating an aerated flow of water, and a secondary aerator, for further refining the aerated flow, includes a deflecting surface to provide the main propulsive effect. The primary aerator comprises a contoured surface positioned transversely to the gas flow, which, in one embodiment, has located therein a series of slots with their axes parallel to the gas flow. Axial and transverse aeration of the water flow adjacent the gas flow are generated simultaneously by the primary aerator from the same axial gas flow. The primary aerator further comprises a deflecting foil spaced from and positioned opposite to the contoured surface which complements both types of aeration generated by the contoured surface. The secondary aerator comprises one or more gas injectors spaced transversely across the inclined rear surface of the vessel's hull and one or more contoured surface diluting foils located rearward of the primary aerator and positioned transversely across the aerated flow from the primary aerator.

Harkins et al. discloses a supercavitating water-entry projectile having empennage on the aft end providing both aerodynamic and hydrodynamic stability and a supercavitation nose section is provided. A representative projectile is a subcaliber munition adapted for use in a 25 mm weapon using a sabot currently in use with the M919 round. The projectile has circumferential grooves around its center section to match these sabots. A key feature in the invention is the size and shape of the nose section. The projectile has a novel high strength extended blunt nose section followed by a truncated conical section which angles towards the body of the projectile in the range of five degrees. During underwater trajectory, the entire projectile in contained within the cavitation bubble formed by the blunt nose tip. The projectile's aft empennage, which provides both aerodynamic and hydrodynamic stability, fits within the bore of the weapon.

The patent to Lang '829 discloses gas filled cavities that reduce drag on the underwater surfaces of marine vehicles. Hydrofoil, struts, boat and ship hulls, pontoons, underwater bodies, fins, rudders, fairings, protuberances, submarine sails and propulsors are underwater surfaces that may be covered by the gas-filled cavities to reduce drag on them. The gas-filled cavities are to be used on underwater surfaces of marine vehicles, such as hydrofoil craft, monohulls, catamarans, small waterplane area twin hull craft, surface-effect ships and wing-in-ground effect vehicles. Each gas-filled cavity is formed by ejecting air near the end of each nosepiece. Air is ejected at a speed and direction close to that of the water at the local cavity wall. The cavity is formed behind the nosepiece. The nosepiece is adapted to control the shape of the cavity. Cavity length is also controlled through controlling air ejection rates, and through the use of a tailpiece to close the cavity within a limited region near the front of the tailpiece.

It should be understood that the present invention would in fact enhance the functionality of the above patents by providing a supercavitation ventilation control system having a cavity control ring and a stop ring, each slidably mounted on the underwater vehicle for selectively adjusting a cavity size surrounding the vehicle body and a termination point of the cavity.

SUMMARY OF THE INVENTION

Therefore, it is an object of this invention to provide a ventilation and control system for a supercavitating vehicle.

Another object of this invention is to provide a ventilation and control system for a supercavitating vehicle in which ventilation gas loss is controlled at any vehicle operating speed and/or depth condition.

Still another object of this invention is to provide a ventilation and control system for a supercavitating vehicle effective during maneuvering of the vehicle.

A still further object of the invention is to provide a ventilation and control system for a supercavitating vehicle in which ventilation control is achieved in conjunction with vehicle maneuvering systems.

Yet another object of this invention is to provide a ventilation and control system for a supercavitating vehicle in which the dimensions of the cavity are actively controlled.

In accordance with one aspect of this invention, there is provided a supercavitation ventilation control system including a vehicle body having a fore end and an aft end. A cavitator is joined to the fore end of the vehicle body, the cavitator generating a gas cavity around the vehicle body. A cavity control ring is slidably positioned at the aft end of the vehicle body, the gas cavity control ring selectively adjusting a terminal end of the cavity formed by the cavitator. A stop ring is adjustably positioned on the vehicle body forward of the cavity control ring for managing a reentrant jet generated by the cavity control ring. Each of the stop ring and cavity control ring are moveable by separate actuators and a single control system.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a supercavitating ventilation control system.

Figure 1:
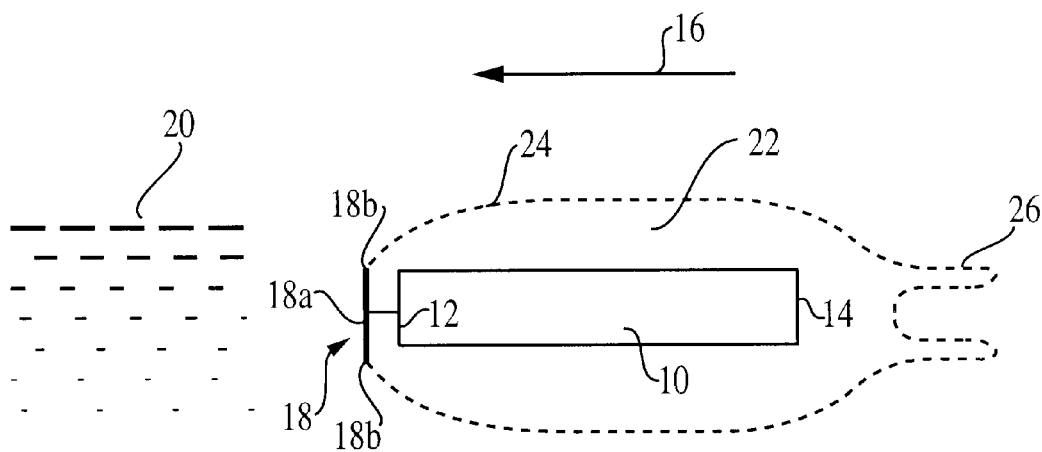
FIG. 1 is a side view of a supercavitating vehicle of the Prior Art.
Figure 2:
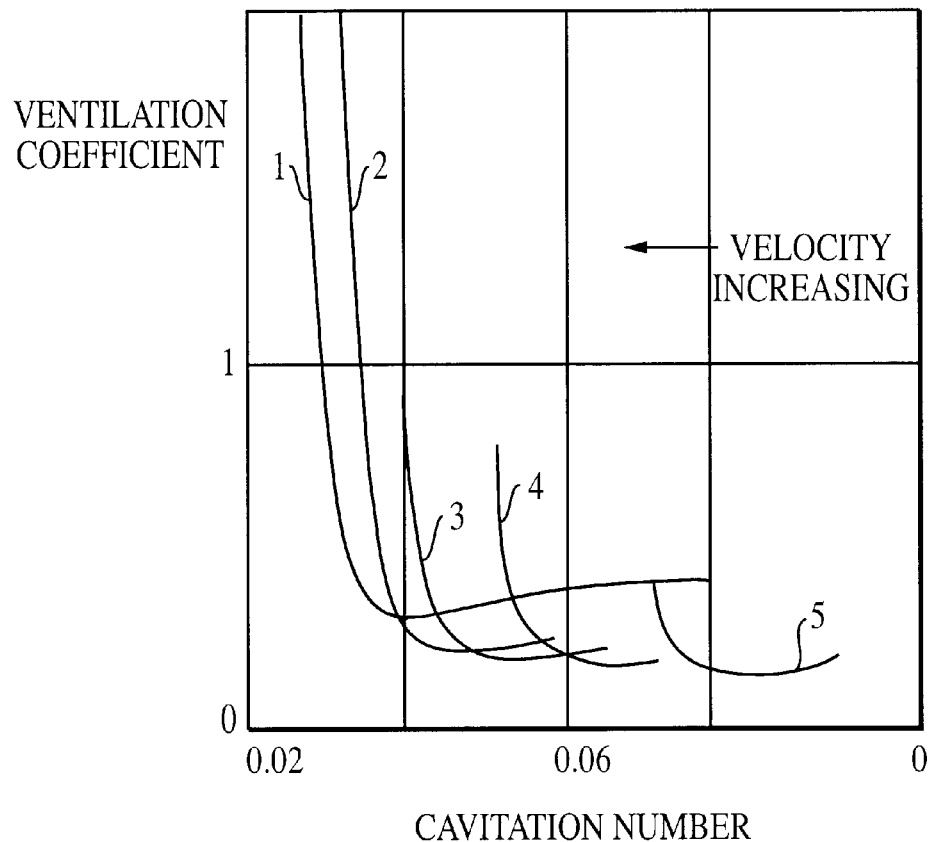
FIG. 2 is a chart characterizing enlargement of a cavity by ventilation gas introduction.
Figure 3:
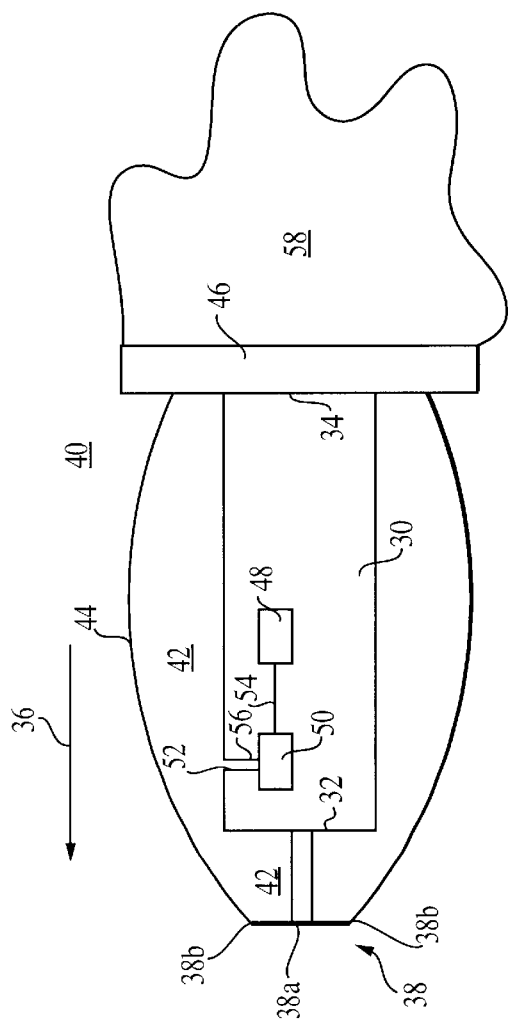
FIG. 3 is a side view showing the effect of a wall boundary on a cavity boundary according to a preferred embodiment of the present invention.

Referring first to FIG. 3, a key feature of the present invention is highlighted. An underwater vehicle body 30 having a forward end 32 and an aft end 34 is shown, the underwater vehicle 30 using supercavitation for drag reduction. The direction of travel of the vehicle 30 is shown with arrow 36.

A cavitator 38 is positioned at the forward end 32 of the vehicle 30. The cavitator 38 is the portion of the vehicle body 30 that is in contact with the liquid 40 in which the vehicle is submersed. The motion of the cavitator 38 in the liquid 40 causes a low-pressure wake (not shown) to form aft of the cavitator 38. The pressure in the wake falls as the speed of the vehicle 30 is increased. Eventually the pressure in the wake falls sufficiently such that a vapor pressure is reached and fluid changes state from liquid to gas, forming a gas filled cavity 42 surrounding the body 30. The cavitator 38 is normally designed with a blunt forward section 38a and sharp detachment points 38b. The cavity 42 forms at the detachment points 38b. The shape of the cavitator 38 and the speed and depth of the body 30 determines the initial size and shape of the cavity 42, however, as will be further explained, the inventive features of the present invention account for the actual size and shape of the cavity 42 as defined by a cavity boundary 44.

In this invention, a ring-shaped wall boundary 46 is adjustably affixed to the vehicle body 30. The cavity boundary 44 forms at the cavitator 38 and terminates on the wall boundary 46. Ventilation gas is stored in a pressure vessel 48. However, other gas storage means such as a chemical gas generator could be employed to practice this invention. A pressure regulation system 50 is employed to control the ventilation outflow pressure (and hence the flow rate) of gas from the pressure vessel 48 to the formed cavity 42. Gas is introduced into the vaporous cavity 42 along the body 30 at a ventilation port 52. Although only one ventilation port 52 is shown, this is not intended to limit the possible number of ventilation ports utilized. Any suitable connection between the pressure vessel 48 and the regulator system 50 of a known type at 54 is understood to be included within the scope of the invention, and is not intended to limit the invention in any way. Similarly, any suitable connection between the regulator system 50 and the ventilation port 52 of a known type at 56 is understood to be included within the scope of the invention. The gas pressure is introduced into the cavity at the ventilation port 52 such that the size of the cavity 42 is selectively increased. The wall boundary 46 effectively eliminates the outflow of gas from the cavity 42. This arrangement may be used at great depths to enlarge the cavity 42, and the cavity pressure regulation system 50 may accommodate changes in vehicle speed or depth by directing an appropriate amount of gas to the ventilation port 52 according to a determined vehicle speed or depth. Accordingly, the pressure regulation system 50 can have a processor, speed senor, and pressure senor for collecting data and calculating the proper cavity pressure. A secondary cavity 58 will form behind the wall boundary 46. The size of the wall boundary 46 is chosen to minimize the size of the secondary cavity 58 and hence the drag on the underwater vehicle 30.

Figure 4:
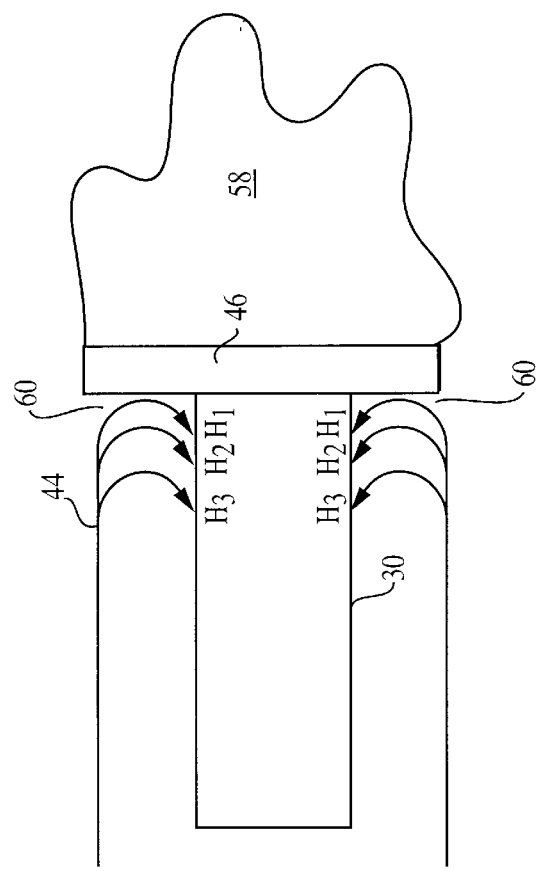
FIG. 4 is a side view showing the effect of reentrant jet closure on a cavitating body.

FIG. 4 shows an additional effect of the wall boundary 46 on the cavity structure. The cavity boundary 44 tends to turn forward as it contacts the wall boundary 46. This "reentrant jet flow" 60 terminates at various locations Hi along the vehicle body 30. The position of the termination varies in both time and circumference. This termination is a source of fluctuating wetted forces along the body 30 and may in some instances affect vehicle control.

Figure 5:
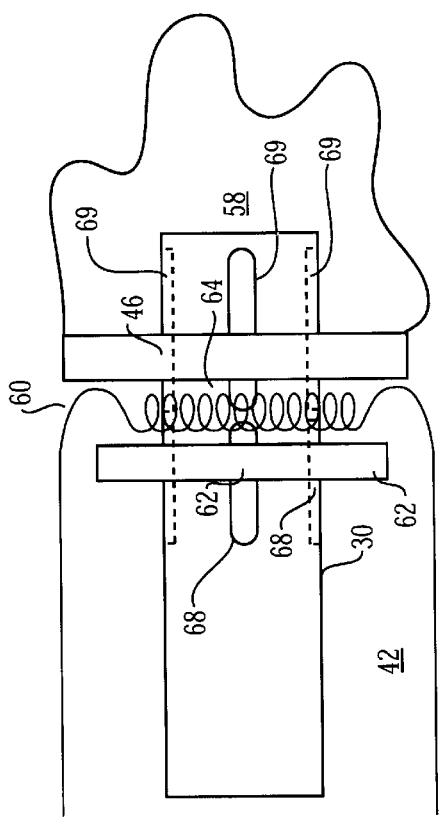
FIG. 5 is a partial side view showing another preferred embodiment of the present invention and including a reentrant jet wall in combination with the wall boundary of FIG. 3.

FIG. 5 shows the introduction of a reentrant jet wall 62 that is adjustably affixed to the body 30 in proximity to the wall boundary 46 to limit the effect the reentrant jet flow 60 will have on vehicle dynamics. A slosh zone 64 is created between the wall boundary 46 and the reentrant jet wall 62 and the size of the slosh zone 64 is a function of the vehicle speed and depth.

Figure 6C:
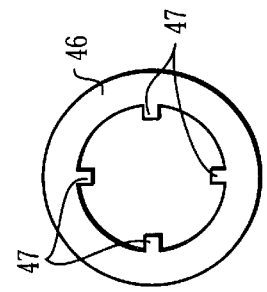
FIG. 6C is an end view of the wall boundary according to the present invention.
Figure 6B:
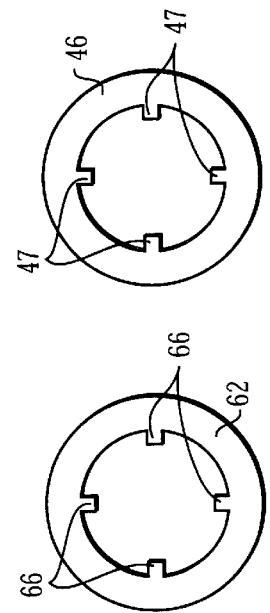
FIG. 6B is an end view of the reentrant jet wall according to the present invention.
Figure 6A:
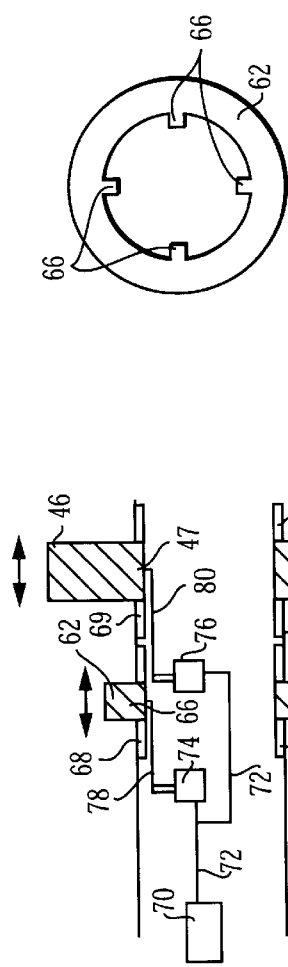
FIG. 6A is a side view of a preferred embodiment of the ventilation control device of the present invention.

FIG. 6A shows a side view of a preferred embodiment of the ventilation control device according to the present invention. The device includes the wall boundary 46 and the reentrant jet wall 62. The end view of the reentrant jet wall 62 is illustrated in FIG. 6B and shows that the wall 62 is attached to the vehicle 30 via a plurality of radially inward protrusions 66. Four protrusions 66 are shown in FIG. 6B, however, more or fewer protrusions may be utilized. Each protrusion 66 slides within a corresponding mating groove 68 formed in an outer surface of the body 30. Likewise, FIG. 6C is an end view of the wall boundary 46 and shows that the wall boundary 46 is attached to the vehicle 30 via a plurality of radially inward protrusions 47. Four protrusions 47 are shown in FIG. 6C, however, more or fewer protrusions may be utilized. Each protrusion 47 slides within the mating grooves 69 formed in the outer surface of the vehicle body 30.

The vehicle speed, depth, ventilation condition and the like are acquired remotely by a control system 70. The vehicle control system 70 is connected, via an electrical connection 72, to two motor controllers 74 and 76. The motor controllers 74, 76 drive a set of actuators and linkages 78 and 80, respectively. Linkage 78 is connected to the reentrant jet wall 62 and linkage 80 is connected to the wall boundary 46. Any known type of motor and linkage use is considered to be included within the scope of the invention. One of ordinary skill in the art will be able to adapt such a motor and linkage to the system. Thus axial control of the position of the wall boundary 46 and reentrant jet wall 62 is achieved. The state of the vehicle is used to optimally position each of the wall boundary 46 and reentrant jet wall 62. By way of example, for a 6 inch diameter vehicle body 30, 6 feet in length, the wall boundary 46 would be approximately 10 inches in diameter and be positioned at the farthest aft position of the body 30 at speeds near 80 meters per second. The reentrant jet wall 62 would be approximately 8 inches in diameter and would be positioned approximately one foot forward off the wall boundary 46. The size of the wall boundary 46 and the reentrant jet wall 62 is a function of cavitator size with larger cavitators requiring larger barrier walls and smaller cavitators requiring smaller barrier walls. The cavitator in the size referenced above would be approximately 3 inches in diameter.

Since the wall boundary 46 limits the length of the cavity 42, the ability to control the length of the cavity is achieved by the ability to control the axial position of the wall boundary 46. Cavity stability is a strong function of vehicle speed and cavity length. The ability to set or to change cavity length at a given speed alleviates cavity stability problems. The monitoring of fluctuations in the cavity pressure may be coupled to the positioning of the wall boundary 46 to permit dynamic control of the cavity length and hence increase its stability.

Figure 7C:
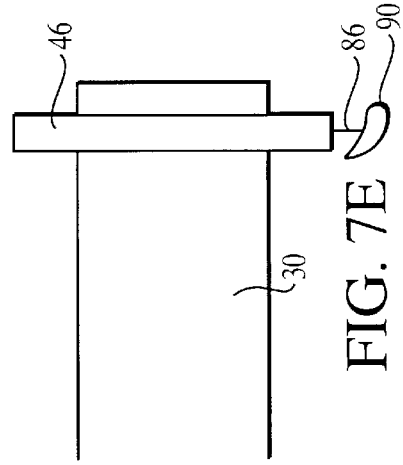
FIG. 7C is an end view of either of the wall boundary or the reentrant jet wall according to a modification of the preferred embodiment of the present invention.
Figure 7E:
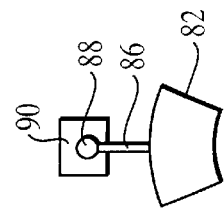
FIG. 7E is a side view of the wall boundary/reentrant jet wall of FIG. 7C.
Figure 7B:
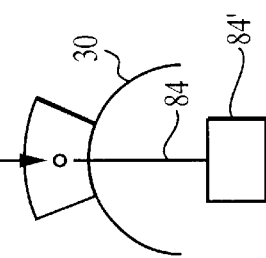
FIG. 7B is an end view of a single section of the wall boundary or jet wall shown in FIG. 7A.
Figure 7A:
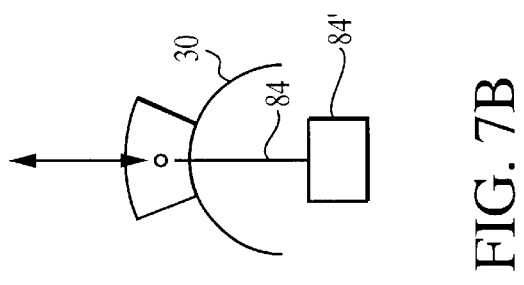
FIG. 7A is an end view of an alternative construction of either of the wall boundary or the reentrant jet wall according to the present invention.

FIGS. 7A and 7B show a further modification of the wall boundary 46 and reentrant jet wall 62. The construction of each of the wall boundary 46 and the jet wall 62 is substantially in the shape of a ring as described, and the ring may be formed of a plurality of sections 82. The sections 82 are connected at 84 to a section actuator 84' that allow independent motion of each section 82 in the radial direction. Section actuator 84' can be joined to control system 70 to allow control of section radius. The sections 82 may be controlled independently to accommodate asymmetries in the cavity boundary 44.

Figure 7D:
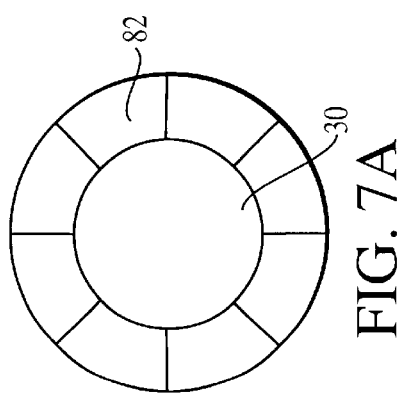
FIG. 7D is an end view of a single section of the wall boundary or reentrant jet wall of FIG. 7C.

The wall boundary 46 can contain an additional feature as shown in FIGS. 7C through 7E. At the end of each section 82, a small strut 86 connects the section to an actuator and controller 88 that positions a section wing/control surface 90 mounted at the end of each section 82. The control surfaces 90 are controlled independently to provide dynamic vehicle control. Each control surface 90 can be maneuvered by actuator 88 to turn the vehicle or to support the weight of the vehicle. Actuator and controller 88 can be in communication with control system 70 in order to coordinate maneuvering of the vehicle. The control surfaces 90 are in constant contact with the wetted flow for constant maneuvering capability.

In view of the above detailed description, it is anticipated that the invention herein will have far reaching applications other than those disclosed herein.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A supercavitation ventilation control system comprising:
   a vehicle body having a fore end and an aft end;
   a cavitator joined to the fore end of said vehicle body, said cavitator being provided to generate a gas cavity around said vehicle body; and
   a cavity control ring slidably positioned at the aft end of said vehicle body, said cavity control ring being provided to selectively adjust a terminal end of the gas cavity generated by said cavitator.

2. The apparatus according to claim 1 further comprising a stop ring adjustably positioned on said vehicle body and forward of said cavity control ring.

3. The apparatus according to claim 2 wherein said stop ring is smaller in diameter than said cavity control ring.

4. The apparatus according to claim 2 wherein:
   said vehicle body includes a plurality of cavity control ring longitudinal grooves formed thereon and a plurality of stop ring longitudinal grooves formed thereon; and
   said cavity control ring includes a plurality of cavity control ring inner radial protrusions corresponding to and slidably engaged with said cavity control ring longitudinal grooves, said cavity control ring being linearly adjustable along the length of said cavity control ring longitudinal grooves; and
   said stop ring includes a plurality of stop ring inner radial protrusions corresponding to and slidably engaged with said stop ring longitudinal grooves, said stop ring being linearly adjustable along the length of said stop ring longitudinal grooves.

5. The apparatus according to claim 2 further comprising:
   a stop ring linkage connected to said stop ring; and
   a stop ring actuator joined to said stop ring linkage to adjust a longitudinal position of said stop ring via said stop ring linkage.

6. The apparatus according to claim 5 further comprising a control device connected to said stop ring actuator to adjust a position of said stop ring on said vehicle body.

7. The apparatus according to claim 2 wherein said stop ring includes a plurality of individual stop ring segments adjustable in a radial direction.

8. The apparatus according to claim 7 further comprising a plurality of stop ring section actuators each joined to one said stop ring segment, each section actuator controlling a radial adjustment of a corresponding stop ring segment.

9. The apparatus according to claim 1 further comprising:
   a linkage connected to said cavity control ring; and
   a cavity control actuator joined to said linkage to adjust a longitudinal position of said cavity control ring via said linkage.

10. The apparatus according to claim 9 further comprising a control device connected to said cavity control actuator tp adjust a position of said cavity control ring on said vehicle body.

11. The apparatus according to claim 10 further comprising:
    a gas source positioned in the vehicle body;
    a regulator joined to said gas source and an exterior of said vehicle body; and said control device further being connected to said regulator.

12. The apparatus according to claim 1 wherein said cavity control ring includes a plurality of individual control ring segments adjustable in a radial direction.

13. The apparatus according to claim 12 further comprising a plurality of control ring section actuators each joined to one said control ring segment, each section actuator controlling a radial adjustment of a corresponding control ring segment.

14. The apparatus according to claim 12 further comprising a control surface formed at a distal end of each said control segment, said control surface being maneuverable to provide dynamic vehicle control.

15. The apparatus according to claim 14 wherein said control surface is a wing shaped member.

16. A supercavitation ventilation control system comprising:
   a vehicle body having a fore end and an aft end and at least one ventilation port;
   a gas source positioned in said vehicle body;
   a regulator joined to said gas source and said ventilation port to selectively initiate a supply of gas from said gas source to an exterior of said vehicle body;
   a cavitator joined to the fore end of said vehicle body, said cavitator provided to generate a gas cavity around said vehicle body;
   a cavity control ring slidably positioned at the aft end of said vehicle body to selectively adjust a terminal end of the gas cavity generated by said cavitator; and
   a control device joined to said regulator and said cavity control ring capable of controlling cavity parameters.

17. The apparatus according to claim 16 further comprising a stop ring slidably positioned on said vehicle body and forward of said cavity control ring and further joined to said control device.

18. The apparatus according to claim 17 further comprising:
   a cavity control ring actuator joined to said cavity control ring and said control device provided to adjust an axial position of said cavity control ring on said vehicle body on command from said control device; and
   a stop ring actuator joined to said stop ring and said control device provided to adjust an axial position of said stop ring on said vehicle body on command from said control device.

19. The apparatus according to claim 18 wherein:
   said control ring further comprises:
      a plurality of cavity control ring segments adjustable in a radial direction; and
      a plurality of cavity control ring section actuators, each joined to one cavity control ring segment, said cavity control ring section actuators being joined to said control device; and
   said stop ring further comprises:
      a plurality of stop ring segments adjustable in a radial direction; and
      a plurality of stop ring section actuators, each joined to one stop ring segment, said stop ring section actuators being joined to said control device.

20. The apparatus according to claim 19 further comprising a control surface formed at a distal end of each said cavity control ring segment and joined to said control device, said control surface being maneuverable to provide dynamic vehicle control.

* * * * *